June 23, 1964   F. C. SCHOEPPE ETAL   3,138,489
HEAVY DUTY DEFERRED ACTION GAS DEPOLARIZED DRY BATTERY
Filed Nov. 24, 1948   2 Sheets-Sheet 1

INVENTORS
FRED C. SCHOEPPE
EDGAR W. BAUMGARDNER
BY D.C. Harrison
ATTORNEY

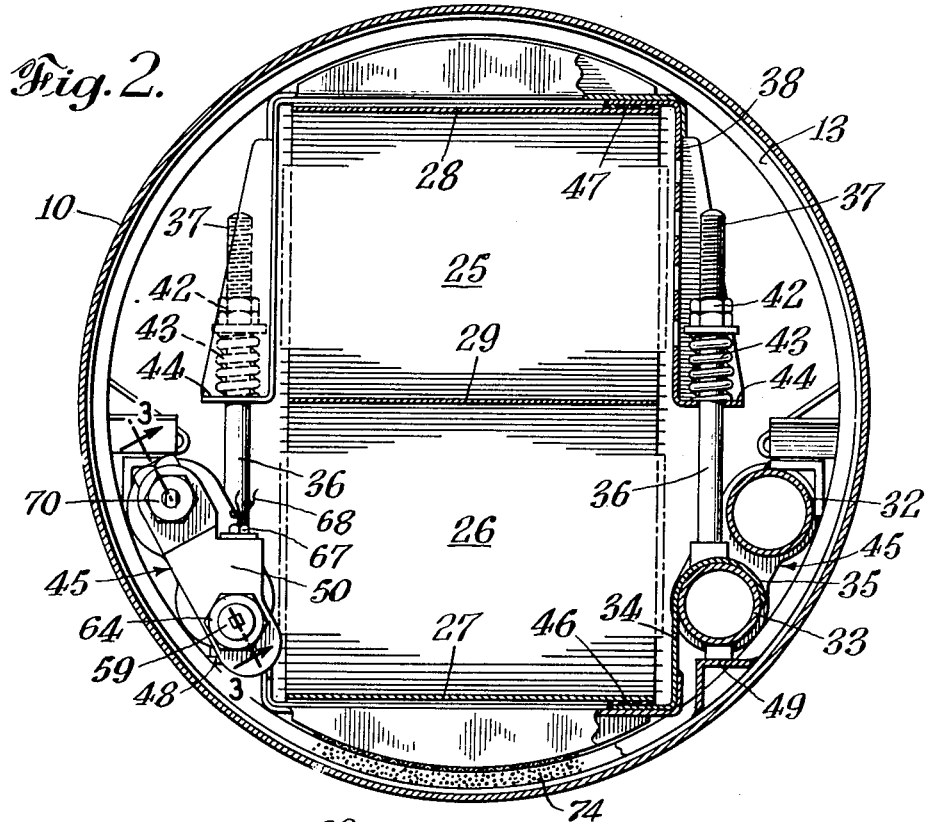
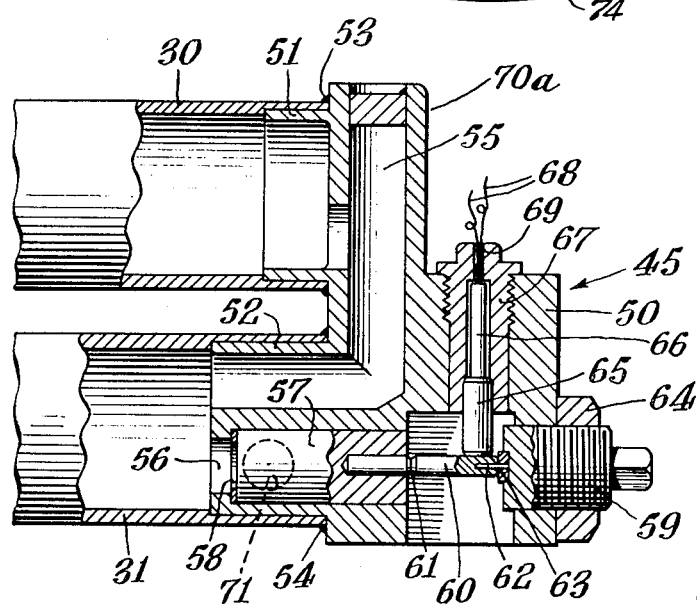
INVENTORS
FRED C. SCHOEPPE
EDGAR W. BAUMGARDNER
BY D.C.Harrison
ATTORNEY United States Patent Office 3,138,489
Patented June 23, 1964

3,138,489
HEAVY DUTY DEFERRED ACTION GAS
DEPOLARIZED DRY BATTERY
Fred C. Schoeppe, Lakewood, and Edgar W. Baumgardner, Rocky River, Ohio, assignors, by mesne assignments, to Union Carbide Corporation, a corporation of New York
Filed Nov. 24, 1948, Ser. No. 61,832
14 Claims. (Cl. 136—86)

This invention relates to a heavy duty primary battery and has for an object to provide such a battery in which the internal resistance is rendered more nearly constant under mechanical shocks. Another object is to shorten the activation time of a deferred action gas depolarized battery. Still another object is to provide a heavy duty battery adapted for embodiment in a submarine torpedo which needs substantially no maintenance nor ventilation during storage.

Referring to the drawings:

FIG. 2 is a section on the line 2—2 of FIG. 1;

FIG. 3 is a section on the line 3—3 of FIG. 2.

Figure 1:
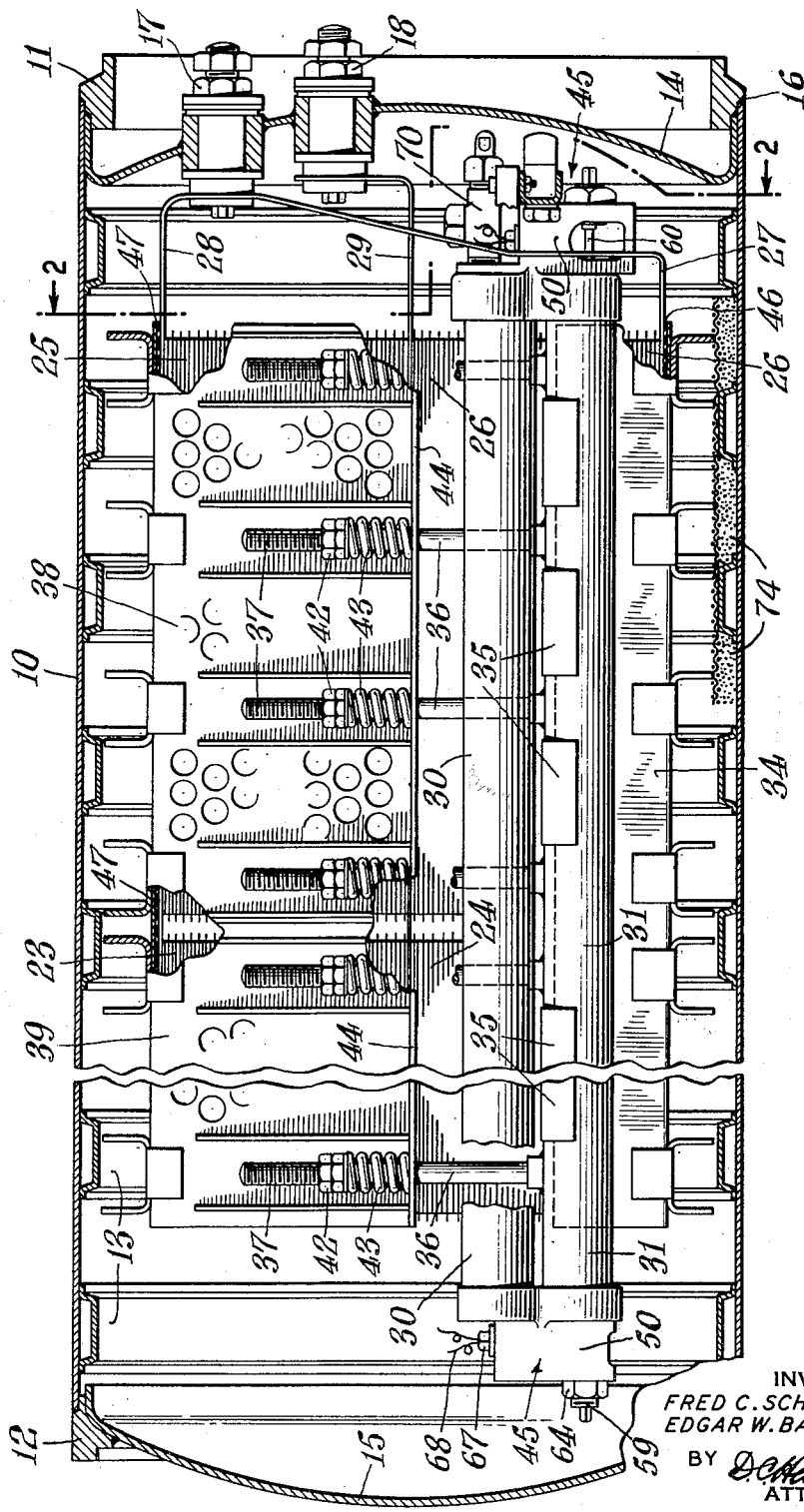
FIG. 1 is a longitudinal section through one embodiment of this invention.

As shown in FIG. 1, the enclosing casing or metal housing is a submarine torpedo shell 10 having aft and forward joint rings 11 and 12 respectively secured thereto and of circular shape. Reinforcing ribs 13 stiffen the shell. At the rear end the shell is closed by an aft bulkhead 14 and by a similar bulkhead 15 at the forward end also secured to the joint ring. A sealing weld 16 between the joint ring on the bulkhead and shell at the aft end secures these elements in place as a final assembly operation. Similar welds are provided at the forward end. Battery terminals 17 and 18 are shown in the aft bulkhead appropriately insulated from each other. Within the shell 10 a battery comprising at least 4 piles or 2 stacks each in voltage opposed relation, each pile being designated by one of the numerals 23 to 26, inclusive. The only number of stacks being shown is four due to the elongated battery and casing being broken away. Each stack comprises 70 cells and each cell is of the type disclosed in the prior application of H. M. Zimmerman and N. C. Cahoon, Serial No. 53,174, filed October 7, 1948, for "Primary Cell and Battery and Method of Making Same," now Patent No. 2,572,296. The outer cells of each stack are connected to the bus bars 27 and 28 shown in FIG. 1 as being of the same potential and connected together while the inner cells of each stack are connected to the bus bar 29 of opposite potential to the bars 27 and 28.

Extending longitudinally of the shell are 4 tubular containers 30 to 33, shown in FIGS. 1 and 2, in which liquefied chlorine is stored so that upon release of the chlorine and its vaporization the porous cathodes of each cell absorb the gaseous chlorine in an aqueos solution for activation of the battery. The lower section of the battery supporting tray 34 is welded to the lower chlorine containers 31 and 33 through the aid of circumferential tabs 35 extending over the lower containers. Fore and aft valve assemblies to be described later connect the two chlorine containers on each side and at each end of the battery.

The vertical studs 36 have threaded upper ends 37 which project from the lower battery strap or tray 34. Clamping members 38 and 39 extend over the top of each battery stack and resiliently hold the cells of each stack under clamping pressure exerted by means of springs 43 and lock nuts 42 holding the clamping members to the vertical studs 36. Each clamping member is provided with a flange or shoulder portion 44 against which the springs 43 act.

Insulation 46 is provided between the lower battery strap 34 and each stack supported thereon. Likewise insulation 47 is placed between the top of each stack and the top clamping members 38 and 39. Rails 48 and 49 on which the battery and the cylinder containers 30 to 33, inclusive, are slid on shell 10 are shown in FIG. 2.

Each valve assembly 45 at the fore and aft ends of the tubular containers 30 to 33, inclusive, is shown in FIG. 3 as comprising a main casting 50 having projecting shoulders 51 and 52 around which are received the ends of the upper and lower tubular containers secured thereto by weld joints 53 and 54 respectively. A channel 55 in the casting 50 connects the inner part of the upper and the lower tubular containers. Adjacent the opening 56 is a cylindrical plug 57 abutting a lead washer 58 and held against the same by a screw 59. Connecting pin 60 between the screw 59 and plug 57 is provided with a circumferential notch 61 at one end and a frangible pin 62 at the other end fitting in a hardened plug 63 in the screw 59. A nut 64 is threaded on the screw 59 and holds the same in adjusted position. A plunger 65 connects the squib 66 with the connecting pin 60, said squib 66 and plunger 65 being mounted within the screw plug 67 from the top of which wires 68 extend for connection to a suitable switch for activating the squib, the wires 68 extending through a hole 69 in the plug 67. A filler valve 70 is located adjacent the position 70a for filling each pair of chlorine containers 30 to 33.

On energizing the squib 66 the plunger 65 is forced outward breaking the frangible pin 62 and the connecting pin 60 at the circumferential notch 61 thereby allowing pressure of the liquid in the lower chlorine container to push the cylinder plug 57 far enough to the right in FIG. 3 to uncover the opening 71 through which chlorine escapes.

The chlorine flows into the lowermost portion of the shell beneath the battery stack of cell elements and where it may be heated in any way desired for vaporizing the liquid into gas quickly. Liquid chlorine is enabled to move from each end of the shell longitudinally inwardly toward the center being vaporized as it does so. Material 74 is some well known means for hastening the conversion of liquid depolarizing material into gas, the same being preferably located adjacent the places of release of liquefied chlorine and longitudinally of the battery casing.

Among the advantages of this invention may be mentioned the provision of a heavy duty battery made up of large size cell elements each thin and about 10½" x 18¼" in area and about ¼" or less in thickness so that the battery of suitable output capacity may be mounted within the dimensions of a submarine torpedo. The battery is capable of being activated quickly within as short a space of time as one second. Having the cells under spring pressure counteracts any tendency for them to become loosened. The clamping pressure is in excess of 5000 pounds on a single stack, being about 30 pounds per square inch. Stack shrinkage is from two causes. The first is shrinkage at a low rate during normal storage and secondly at a more rapid rate during discharge as the cell liquid components tend to become squeezed out. Since each assembly is subjected to shocks tending to disturb the cell a flexible clamping structure is provided to take up any slack and maintain a firm structure having a substantially constant internal resistance. In one discharge test stacks of cells 8⅛" in depth at the start shrank to 7" during the test. In discharge any thrust of setback on starting is longitudinally of the shell 10 and transversely of the cell stack. Having the stack arranged so that the central portions of each stack are at the same potential lessens insulation requirements. All four cylinders of chlorine are released at once in response to the thrust of set-back transmitted to a switch for setting off the squibs 66. Prior to activation the various stacks of cell elements may be maintained under partial vacuum to assist in rapidly activating the battery when needed. The force of set-back tends to empty the chlorine storage tanks. Instead of being activated by set-back the squib may be fired in response to manually or automatically closing a switch in launching a torpedo. Unlike the use of ordinary storage batteries for driving a torpedo, chlorine depolarized deferred action dry battery of this invention needs no maintenance nor ventilation during its shelf life or while being stored.

What is claimed is:

1. A battery of dry cells having a plurality of substantially flat electrodes with immobilized paste electrolyte material therebetween, resilient means for mounting said cells under pressure applied to said electrolyte material axially of said cells, in combination with a vehicle in which said battery is mounted with said plates generally parallel to the direction of travel of said vehicle, whereby any thrusts on said battery due to acceleration or deceleration of the vehicle are in a direction along rather than against said plates to minimize any change in internal resistance of the battery due to said thrusts.

2. In a deferred action gas depolarized battery of cells each of which is of the type having a porous cathode portion and a moist cathode portion with an immobilized electrolyte paste between an anode and the moist cathode portion, the combination therewith of the improvement for reducing the effect of shrinkage at a slow rate in the battery during storage and at a more rapid rate during discharge, said improvement including a substantially rigid and fixed support for one end portion of said battery normal to a longitudinal axis of the battery, a stack of said cells at least several inches thick contiguous said support, a clamp cooperating with the opposite end of said stack from the rigid support, extensions from at least one of said clamp and rigid support, and resilient means for applying pressure to said electrolyte paste substantially uniformly over the area of the cells and axially of said stack in an amount less than is capable of squeezing said electrolyte paste from said cells and stack.

3. A deferred action dry battery as set forth in claim 2 in which the axial pressure applied to said stack is not more than 30 pounds per square inch on said electrolyte paste.

4. A deferred action dry battery as set forth in claim 2 in which said extensions are outside of said stack and are generally parallel to the stack longitudinal axis, and said clamp is also provided with lateral portions extending parallel to the stack longitudinal axis, said lateral portions having flanges thereon and said resilient means being between said extensions and said flanges on the lateral portions of said clamp.

5. A battery according to claim 2 in which the battery is mounted in a vehicle with the cells thereof generally parallel to the direction in which forces of acceleration and deceleration of the vehicle act upon said battery, whereby the internal resistance of the battery and the danger of squeezing out electrolyte paste from the cells is less during starting and stopping of the vehicle than would be the case if such resilient means were not present.

6. A battery according to claim 2 in which said resilient means is capable of expansion to maintain pressure on the cells after the battery has been contracted and the resilient means expanded as much as 1" to compensate for shrinkage in the axial length of the battery of at least that amount.

7. In a dry battery of cells which are in series and which are of the chlorine depolarized deferred action type having porous and moist cathode portions for activation by gaseous chlorine moving into the porous cathode portions and going into an aqueous solution in the moist cathode portions, an enclosing housing around said battery to retain the activated chlorine gas in contact with said battery, said battery being mounted above the bottom of said housing, and a storage tank for liquid chlorine under pressure connected with the inside of said housing, the combination therewith of the improvement for shortening the time for activation of said battery, said improvement including a slidable valve controlling the outlet of liquid chlorine from said storage tank, means for holding said valve in closed position against pressure within the tank, squib operated means for releasing said valve holding means, an electrical circuit for firing said squib, and a discharge passage for liquid chlorine from said valve leading into an end portion of said housing adjacent the bottom thereof.

8. A battery according to claim 7 in which said tank and squib operated valve are located within said housing.

9. A battery according to claim 7 in which there are at least two tanks arranged longitudinally of said housing for holding liquid chlorine with at least one tank on each side of said battery.

10. A battery according to claim 7 in which a supporting track is provided for said tanks and battery, and a bridge is provided for supporting the battery, said bridge extending transversely of and between said tanks.

11. A battery according to claim 7 in which liquid chlorine is discharged from said tank under internal pressure within said tank, by gravity, and by the force of acceleration of a vehicle in which the battery is mounted, with said tank extending in the direction of vehicle movement.

12. A battery according to claim 7 in which heating means is provided adjacent said discharge passage to expedite vaporization of the liquid chlorine.

13. In a battery of stacked dry cells of the deferred action type in which substantial shrinkage occurs after activation and during use and in which said battery has a plurality of substantially flat electrodes connected in series between which is immobilized paste, the combination therewith of the improvement for compensating for such shrinkage and rendering the internal resistance of said battery more nearly uniform as and after shrinkage occurs when said battery is mounted in a vehicle, said improvement including resilient clamping means for said battery comprising a fixed abutment adapted to be secured with respect to said vehicle and against which said battery is held, a clamping plate cooperating with an end of said battery opposite that engaged by said abutment for applying pressure to the electrolyte paste of each cell of a value to reduce internal resistance of the cell but less than enough to extrude said paste from between said flat electrodes, and a spring device in cooperation with said plate and abutment for maintaining uniform pressure across said plate, electrodes, and the paste between them, all edges of each electrode being free to move toward said abutment to maintain the clamping pressure substantially uniform across the area of each electrode.

14. A battery according to claim 13 located in a vehicle with the flat electrodes disposed substantially parallel to the direction of vehicle movement.

References Cited in the file of this patent

UNITED STATES PATENTS

| | | |
|---|---|---|
| 384,660 | Zalinski | June 19, 1888 |
| 578,710 | Barrett | Mar. 16, 1897 |
| 914,342 | Edison | Mar. 2, 1909 |
| 1,218,847 | Firey | Mar. 13, 1917 |
| 1,267,613 | Whitney et al. | May 28, 1918 |
| 1,379,088 | Edison | May 24, 1921 |
| 1,687,416 | Wood | Oct. 9, 1928 |
| 2,005,275 | Thomas | June 18, 1935 |
| 2,396,534 | Rose | Mar. 12, 1946 |
| 2,404,144 | Riggs et al. | July 16, 1946 |
| 2,433,024 | Burgess | Dec. 23, 1947 |